US008234200B2

(12) United States Patent (10) Patent No.: US 8,234,200 B2
Grazlano et al. (45) Date of Patent: Jul. 31, 2012

(54) SYSTEM AND METHOD FOR IDENTIFYING ACCOUNTING ANOMALIES TO HELP INVESTORS BETTER ASSESS INVESTMENT RISKS AND OPPORTUNITIES

(75) Inventors: Ronald J Grazlano, Chicago, IL (US); Joel Litman, Columbus, OH (US)

(73) Assignee: Credit Suisse Securities (USA) LLC, New York, NY (US)

( * ) Notice: Subject to any disclaimer, the term of this patent is extended or adjusted under 35 U.S.C. 154(b) by 642 days.

(21) Appl. No.: 11/479,771

(22) Filed: Jun. 29, 2006

(65) Prior Publication Data

US 2007/0022025 A1 Jan. 25, 2007

Related U.S. Application Data

(60) Provisional application No. 60/695,032, filed on Jun. 29, 2005.

(51) Int. Cl.
*G06Q 40/00* (2012.01)
(52) U.S. Cl. .............. 705/36 R; 705/35; 705/37
(58) Field of Classification Search ........... 705/35, 705/36 R, 37
See application file for complete search history.

(56) References Cited

U.S. PATENT DOCUMENTS 5,220,500 A * 6/1993 Baird et al. .............. 705/36 R
5,644,727 A * 7/1997 Atkins ..................... 705/40
7,483,842 B1 * 1/2009 Fung et al. ................ 705/7.14
7,720,751 B2 * 5/2010 Bongiorno et al. ........ 705/38
7,765,127 B2 * 7/2010 Banks et al. .............. 705/26.8
2004/0044505 A1 * 3/2004 Horwitz ..................... 703/3

OTHER PUBLICATIONS

Off-balance-sheet activities, earnings persistence and stock prices: Evidence from operating leases. New York University Website: http://w4.stern.nyu.edu/accounting/docs/speaker_papers/spring2006/Off_balance_sheet.pdf (Jan. 23, 2006) pp. 2-4.
ESOPs as an Estate Planning Vehicle for Business Owners by Christopher C. Hirschfeld. FPA Journal Website: http://www.fpanet.org/journal/articles/2002_Issues/jfp1102-art11.cfm (Nov. 22 issue) pp. 1,8.
Insurope's UK Network Partner Becomes Market Leader. Insurope Website: http://www.insurope.com/Files/Newsletter-03.pdf (Dec. 2002 issue #3) pp. 1,17.
Statement of Financial Accounting Standards No. 133. Financial Accounting Standards Board Website: http://www.fasb.org/pdf/fas133.pdf (Jun. 1998) pp. 177-180.
New Century Financial Corp. The Reit Conversion. Edgar online Website: http://sec.edgar-online.com/2004/08/16/0001193125-04-141738/Section2.asp (Aug. 2004) p. 65.
Financial Analysts: Best practices in an integrated European financial market. AIAF Website: http://sviluppo.aiaf.it/html/allegati/20030904UE.pdf (Sep. 2003) Annex 7.

* cited by examiner

*Primary Examiner* — Muriel Tinkler
(74) *Attorney, Agent, or Firm* — Kenneth L. Johnson; Chardbourne & Parke LLP

(57) ABSTRACT

A system and method of identifying accounting anomalies to assess investment risks and opportunities. The steps include receiving company data and criteria metrics, and evaluating the company data in view of the criteria metrics to produce a performance indicator. Information, such as an easily read visual flag is provided to a client identifying the performance indicator.

16 Claims, 11 Drawing Sheets

Framework 100

FIG. 3B

| | REV. RECOGNITION | | | COST RECOGNITION | | | | | P&L/ CASH FLOW | BALANCE SHEET RECOGNITION | | | | |
|---|---|---|---|---|---|---|---|---|---|---|---|---|---|---|
| | Accounts Receivable | Deferred Revenue | % AR | TOTAL REVENUE RECOGNITION | Depreciation | In-Process R&D | Accounts Pay. | Accrued Exp. | Inventory/COGS | TOTAL COST RECOGNITION | | TOTAL: ASSET RECOGNITION | VALUATION | OVERALL SCORE | TOTAL #of Sub-categories in the Top Quantile |
| | 19 | 6 | 6 | 11 | 40 | 33 | 97 | 23 | 4 | 33 | 22 | 97 | 5 | 39 | 26 | 12 | 24 | 1 |
| | 26 | 6 | 8 | 14 | 39 | 33 | 79 | 40 | 9 | 34 | 19 | 29 | 16 | 23 | 1 |
| | H | H | L | L | H | L | L | L | H | | | L | L | L | H | |
| | 110A | | | | 110B | | | | | | 110C | 110D | | 110E | |

P&L/ CASH FLOW QUALITY

| | H | H | M | | L |
|---|---|---|---|---|---|
| | Special Items | Net Income | Stock Options Payment | Sustainability | TOTAL P&L CASH FLOW |
| | 12 | 29 | 8 | 13 | 29 |
| | 50 | 23 | 6 | 13 | 20 |

Valuation Category 110E Summary

| Company | TOTAL # of Categories in the Top Quantile | OVERALL SCORE (extreme score = Signal Flag) | | REVENUE RECOGNITION | | COST RECOGNITION | | P&L / CASH FLOW | | BALANCE SHEET RECOGNITION | | VALUATION | |
|---|---|---|---|---|---|---|---|---|---|---|---|---|---|
| PQR | 5 | 9 | 33 | 95 | Medium 41 | 41 | High 35 | 22 | High 38 | 57 | Medium 45 | 15 | Low 51 |

Category scores 450 (9, 95, 22, 57, 15), category ranks (34, 41, 35, 38, 45, 51)

460 — 450

Valuation Sub-Category (110E) Summary

FIG. 4C

CHARACTERISTICS UNDERLYING VALUE CATEGORY/SUB-CATEGORY 110E

Valuation (High Expectations)

| Company | Ticker | Value / Cost (current) | Relative Rank | Value/ Cost Change (Current to 3 YR Median) | Relative Rank | Enterprise Value / Gross Cash Flow (Current) | Relative Rank | Enterprise Value / Gross Cash Flow (Current to 3 YR Median) | Relative Rank | Total Weighted Rank |
|---|---|---|---|---|---|---|---|---|---|---|
| | | 1.1 / 420 | 20 / 425 | (4%) / 420 | 33 / 425 | 1.9 / 420 | 20 / 425 | 4% / 420 | 51 / 425 | 12 / 430 |
| PQR | | | | | | | | | | |

130 →

Characteristics risk scores 420 (1.1, 4% 1.9, 4%) and a total weighted rank 430 (12)

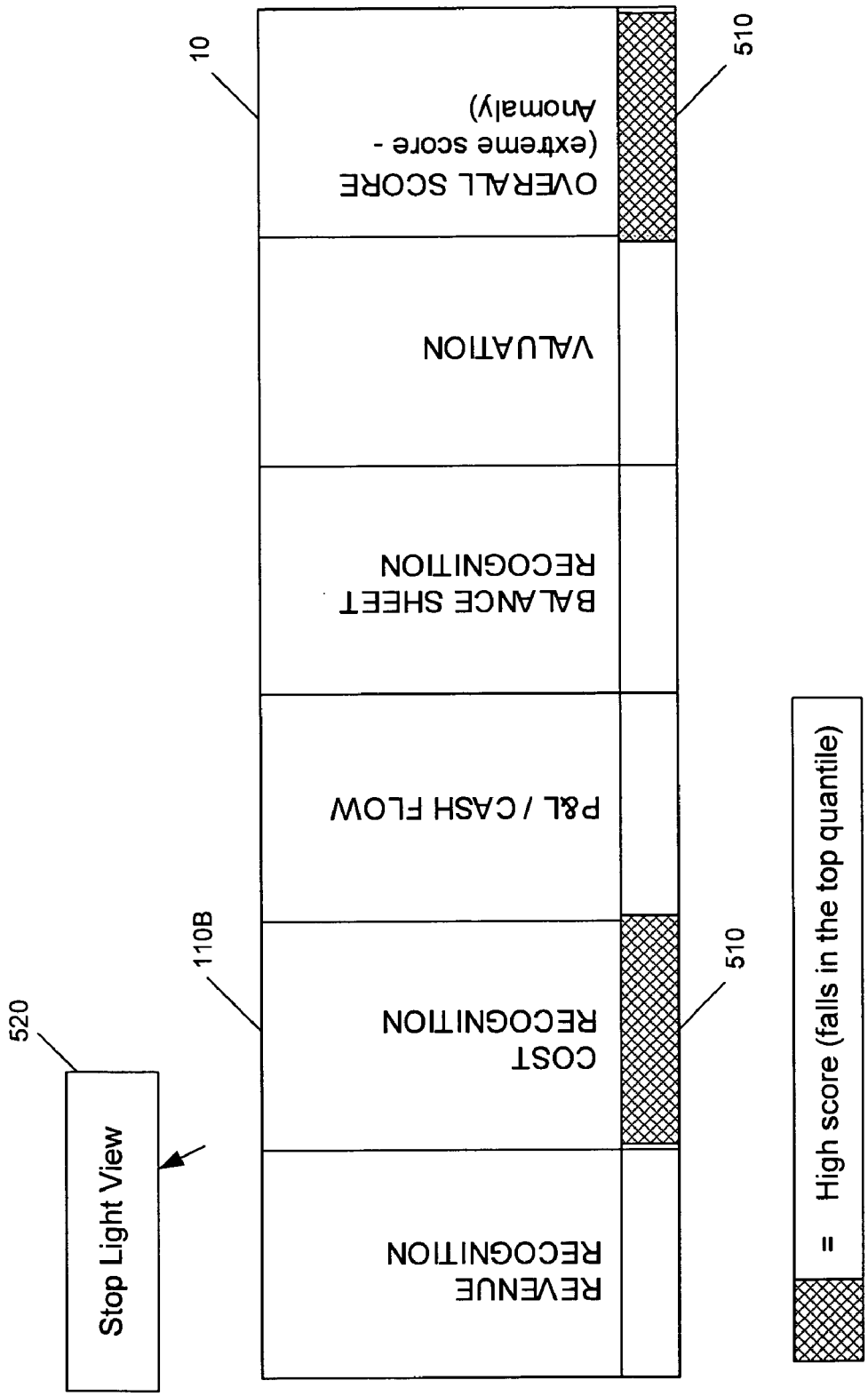

SYSTEM AND METHOD FOR IDENTIFYING ACCOUNTING ANOMALIES TO HELP INVESTORS BETTER ASSESS INVESTMENT RISKS AND OPPORTUNITIES

PRIORITY AND RELATED APPLICATION

This application claims priority to U.S. Provisional Patent Application No. 60/695,032 entitled "System and Method for Identifying Accounting Anomalies to Help Investors Better Assess Investment Risks and Opportunities," filed on Jun. 29, 2005, which is hereby incorporated by reference in its entirety.

BACKGROUND OF INVENTION

There exists a need for a system and method for identifying financial and accounting anomalies that will enable investors to make more informed investments and investment related decisions. The present invention provides a solution to this need.

SUMMARY OF INVENTION

It is an object of the present invention to provide a system and method that leverages data contained in corporate financial statements, regulatory databases and proprietary databases to identify financial and accounting anomalies that help investors better assess investment risk and opportunities.

It is a further object of the present invention to provide a screening and scoring engine that evaluates the quality of a company's accounting or other disclosures relative to other companies, industries and real economic cash flows.

Investors gauge investment risk and opportunities by evaluating companies and securities based on information in convenient financial analysis or accounting categories. The financial analysis or accounting categories may include one or more subcategories and characteristics, for example, Assets may include the subcategories Current Assets and Long Term Assets. The present invention provides multiple screening variables that target financial disclosure risk in sensitive financial analysis or accounting categories (hereinafter "F/A categories") including revenue recognition, expense and capitalization, and capital structure, by identifying, for example, abnormal accounting, financial or reported growth characteristics; aggressive accounting practices that might distort economic performance; and other issues that might create a higher risk for regulatory inquiry or accounting restatement. The present invention further provides a system and method for evaluating a company's financial disclosure risk profile relative to other companies and industries by, for example: creating a risk profile for each company in a portfolio by assigning a score and relative rank to each company across a number of F/A categories of interest; assigning more or less weight to a particular F/A category, or subcomponent thereof, based on historical incidence of accounting misstatement in a particular category and/or based on an investor's/analyst's subjective judgment of which F/A categories are more or less important to his/her investment decisions; and providing multiple options for distributing and viewing the relative risk profiles of a portfolio of companies in ways that are meaningful to the investor/analyst.

In an exemplary embodiment, the methodology is applied to a selected set of F/A categories and sub-categories, each of which is supported by a number of individual disclosure characteristics and footnote screening variables. The selected F/A categories may relate to financial aspects such as accounts receivable, accounts payable, depreciation, in-process research and development, accrued expenses, stock options, off balance sheet financing, asset quality and other areas. Individual screening variables or characteristics underlying each F/A category might include traditional financial statement lines (revenue, expense), "cleaned" accounting calculations (including, but not limited to, off-balance sheet liabilities such a pensions and lease obligations), proprietary data collected from other sources and information collected from regulatory databases relating to financial restatements and SEC inquiries, for example. The set of F/A categories, subcategories, and the individual screening variables that are selected as being pertinent for accounting anomaly risk analysis may vary significantly depending on the user's investment objectives, applicable accounting standards, market and regulatory trends, the availability of sources of data and other exigencies.

According to an exemplary embodiment of the present invention, each company in a particular portfolio is scored for risk by analysis of selected individual screening variables across a selected set of F/A categories and subcategories, and then ranked relative to other companies in the portfolio. Companies that score or rank in the top quantile for risk in a particular F/A category, subcategory, or characteristics may be brought to the user's attention by flagging or highlighting them, for example, over a screen display with red-shading to indicate high risk. A weighting can also be applied to each F/A category, subcategory, or characteristic, based on the historical incidence of accounting misstatement in a particular area or can be applied by a user based on his/her subjective judgment of which F/A categories, subcategories, or characteristics are more or less important to his/her investment decisions. The quantitative analysis may be followed by individual issue analyses to better understand the quality and nature of the identified risks.

It is an object of the present invention to create a system for identifying and assessing financial and accounting risks, i.e., "Signal Flags," to help clients improve their investment processes and investing decisions. The present invention can be used to identify companies within a portfolio that have a risk of accounting misstatements, and can be further used to assess risk profiles across entire portfolios. The present invention also assesses the quality of a company's performance and risk to market expectations. This can be used to help identify industry themes and facilitate intra-industry benchmarking, which in turn can facilitate cash trades.

DESCRIPTION OF THE DRAWINGS AND THE APPENDIX

FIGS. 3A and 3B are screen shots of detailed and summarized company risk profile scores and ranking information, which is presented over interactive user interfaces, in accordance with the principles of the present invention.

FIGS. 4A-4C are also screen shots of detailed and summarized company risk profile scores and ranking information, which is presented over interactive user interfaces, in accordance with the principles of the present invention.

FIGS. 5A and 5B are illustrations of display features for conveying relative risk scores and ranking information, which is color coded for easy visual recognition by users, in accordance with the principles of the present invention.

Appendix A provides definitions and descriptions of the financial accounting categories and subcategories named herein.

DETAILED DESCRIPTION

The present invention provides systems and methods for developing risk profiles of individual companies in a portfolio based upon identification and analysis of accounting anomalies in financial and accounting reports and other disclosures relating to the companies. The systems and methods can provide comparative risk rankings that are useful for making investment and portfolio management decisions. The risk profiles of the companies are developed within a structured analytical description or framework of the financial condition or status of a company. The structured framework is designed to bring out aspects or categories of financial information that are deemed important in determining risk and in making investment and portfolio management decisions.

Figure 1:
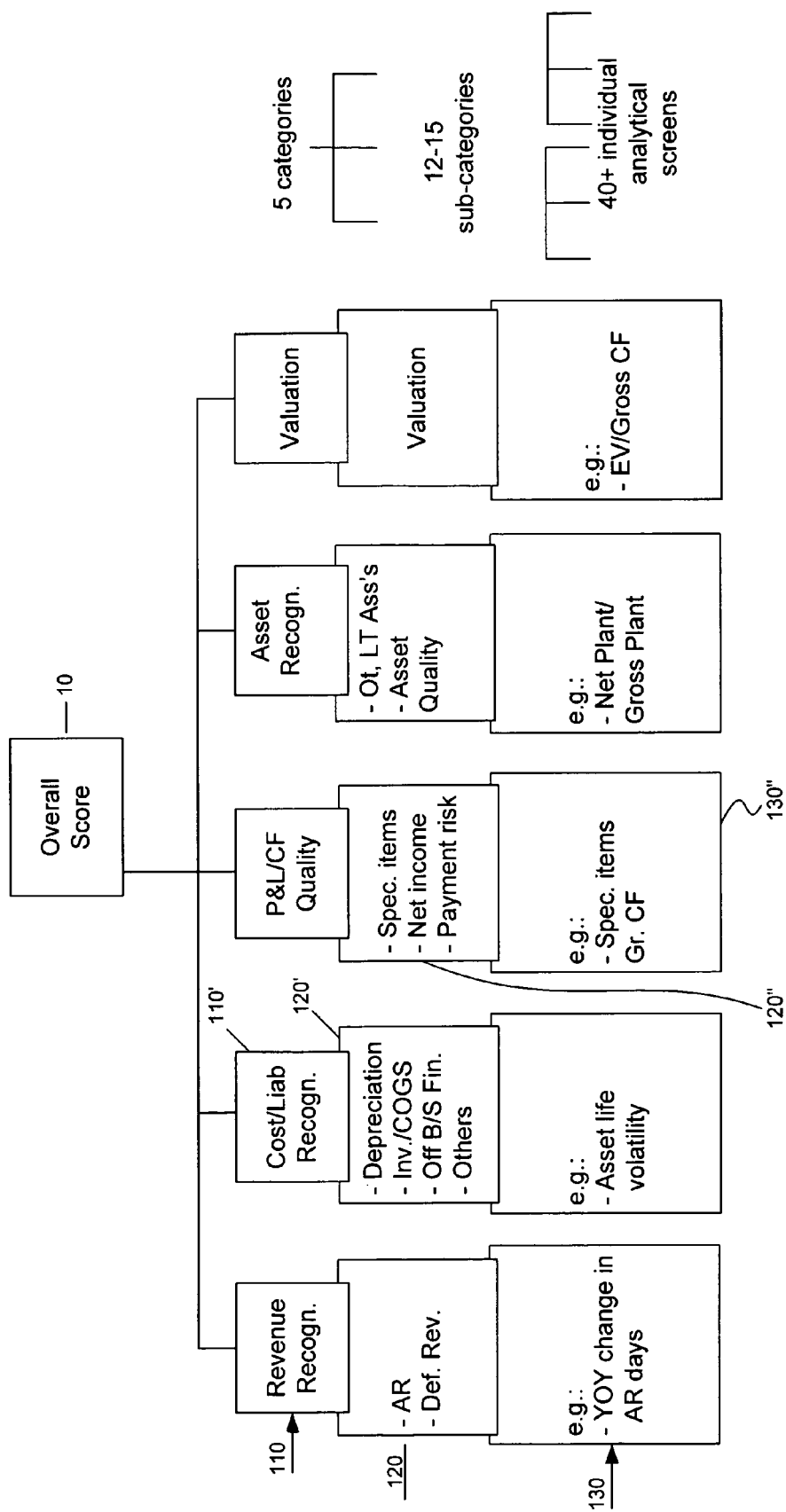
FIG. 1 is inverted-tree diagram illustrating a structured financial information description or framework under which accounting-anomaly based company risk profiles are developed in accordance with the principles of the present invention.

FIG. 1 illustrates an exemplary structure or framework 100 for developing accounting-anomalies based risk profiles of companies in a portfolio, in accordance with the principles of the present invention. Each company in the portfolio is assigned an accounting-anomalies based risk score (hereinafter simply "risk score") and comparatively ranked for risk in a selected set of primary F/A categories 110, and selected individual subcategories 120 and characteristics 130 that make up particular F/A categories 110, to create a detailed risk profile for that company. The risk score assigned to a company at each higher level (i.e. sub-category level or category level) is a function of the risk scores assigned at the lower level (i.e. characteristic level or sub-category level, respectively). For example, the risk score assigned to a company in a particular category 110' may be a suitably weighted sum or product of the risk scores assigned to the company in all selected subcategories 120' that contribute to particular category 110'. Similarly, the risk score assigned to a company in a particular subcategory 120" may be another suitably weighted sum or product of the risk scores assigned to the company in all selected characteristic 130" that contribute to particular subcategory 120". An overall risk score (e.g., score 10) may be assigned to the company based on a weighted sum or product of the scores or ranks in each of the primary F/A categories 110.

The systems and methods of the present invention may include suitable user interfaces to present detailed and/or summarized risk score and rank information at each level to users (e.g., web-based interactive worksheet displays, FIGS. 3A-3B, 4A-4C and 5A-5B). The presentations may be designed to provide quick snapshots and clear signals of risk when warranted (e.g., FIGS. 5A and 5B).

Particular framework 100, as indicated to the right in FIG. 1, is based on an exemplary selection of five primary categories 110, twelve to fifteen subcategories 120, and forty or more individual characteristics 130 as being relevant or pertinent to the risk profiles of companies. It will be understood that the selection shown is only exemplary, and that the number and types of primary F/A categories, subcategories and characteristics may be suitably selected for the risk profiling framework upon consideration of, for example, the theoretical advantages of the particular selections for risk assessment and the practicality of such financial analyses. It will be further understood that the definitions of the primary F/A categories, subcategories and characteristics may follow standard financial analysis and accounting practices. Alternatively, one or more of the primary F/A categories, subcategories and characteristics may have non-standard definitions according to financial analyses that are proprietary or local to a research provider. Further, the selected financial analyses may reflect current security industry or personal practice, fashions, or perspectives on which financial analyses/categories represent information that effectively describes and corresponds to a company's present condition or future performance. The selection of the set of primary F/A categories 110, subcategories 120 and characteristics 130 for risk profiling also may depend on considerations of type of the company, and may vary by industry type (e.g., manufacturing or financial industries).

Figure 3A:
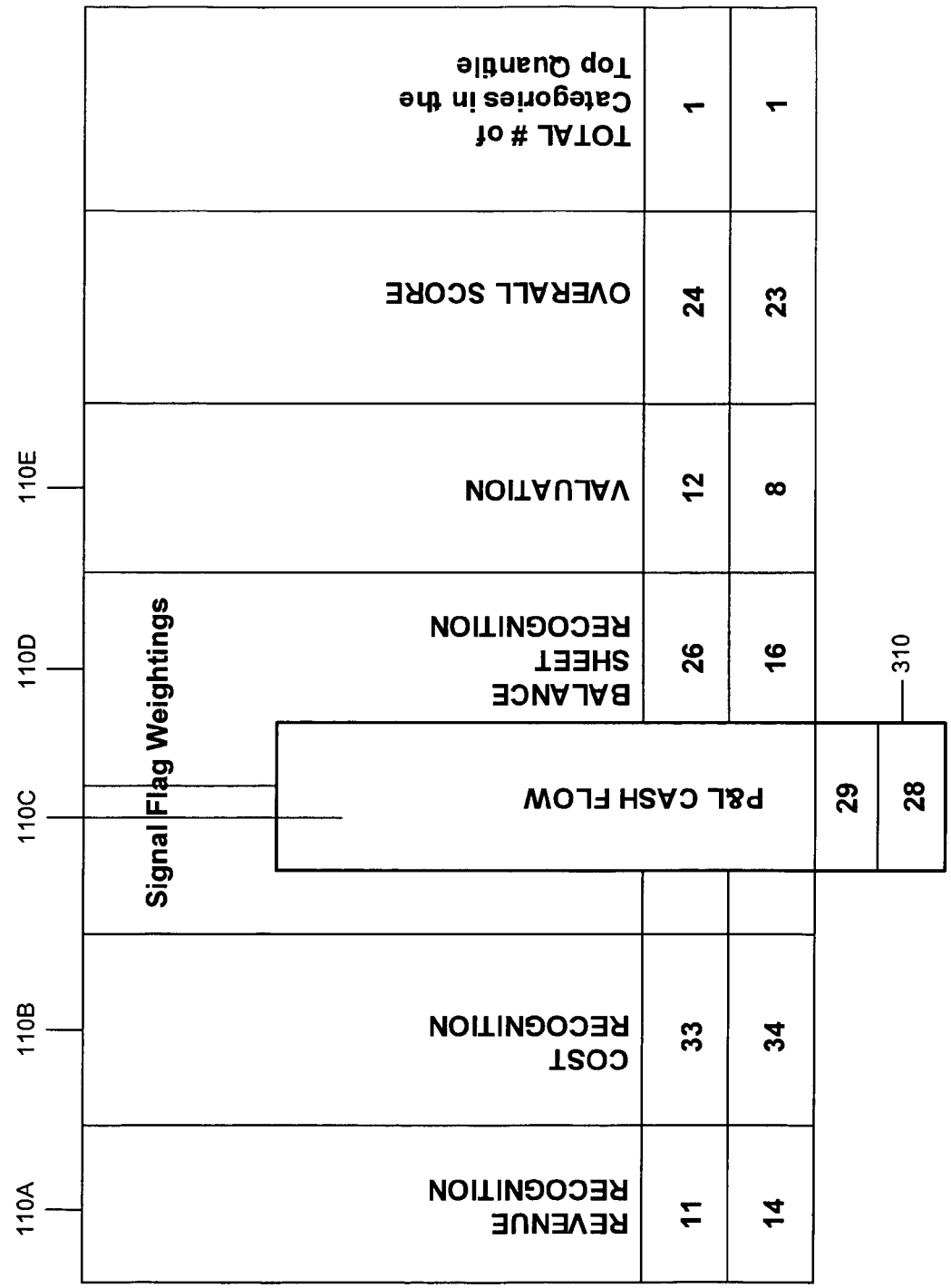

In a preferred embodiment of the invention, primary F/A categories 110 used for developing risk profiles and assigning overall risk scores to companies in a portfolio include categories 110A-110E, namely "Revenue Recognition" 110A, "Cost Recognition" 110B, "P&L/Cash Flow Quality" 110C, "Balance Sheet Recognition" 110D, and "Valuation" 110E. (See FIGS. 3A and 4A). Each of primary categories 110A-110E may have one or more secondary underlying subcategories or characteristics. For example, as shown in FIG. 3B, primary category "Revenue Recognition" 110A may include "Accounts Receivable", "Deferred Revenue" and "Doubtful Accounts Receivable Percentage" sub-categories; primary category "Cost Recognition" 110B may include "Depreciation", "In-Process Research & Development", "Accounts Payable" "Accrued Expenses" and "Inventory and COGS" subcategories; primary category "P&L Cash Flow Quality" 110C may include the "Special Items", "Net Income", "Stock Options" and "Payment Risk" sub-categories; and primary category "Balance Sheet Recognition" 110B may include the "Off Balance Sheet Financing", "Other Long-term Assets" and "Asset Quality" sub-categories. In a preferred embodiment shown in FIGS. 3A and 3B, primary category "Valuation" 110E includes only a single, "Valuation" sub-category.

Further, one or more individual screening variables, or individual characteristics contribute information to or supports each of the F/A sub-categories. Individual characteristics may include traditional financial statement lines (revenue, expense), standard or "cleaned" accounting calculations (including, but not limited to, off-balance sheet liabilities such a pensions and lease obligations), proprietary data collected from other sources and information collected from regulatory databases relating to financial restatements and SEC inquiries, for example. According to a preferred embodiment, shown in FIGS. 4A-4C, "Valuation" category/sub-category 110E may include the "Current Value-to-Cost Ratio (VCR)" characteristic, the "Median VCR" characteristic (i.e., the median VCR measured over a predetermined period), the "Current EV/Gross Cash Flow (EV/GCF)" characteristic and the "Median EV/GCF" characteristic (i.e., the median EV/GCF measured over a predetermined period). The VCR is a valuation multiple developed by assignee Credit Suisse, which eliminates some of the accounting and inflation distortions inherent in traditional multiples such as P/E and EV/EBITDA (i.e., the enterprise multiple). The VCR characteristic in practice has shown a higher correlation with changes in a company's stock price than the traditional multiples. The EV/GCF multiple is a variant of the traditional enterprise multiple (i.e., EV/EBITDA). One of ordinary skill in the art will recognize that the standard multiples of P/E and EV/EBITDA, or other valuation multiples, could readily be substituted for the VCR and EV/GCF characteristics employed in the preferred embodiment without departing from the spirit of the present invention.

Figure 4B:
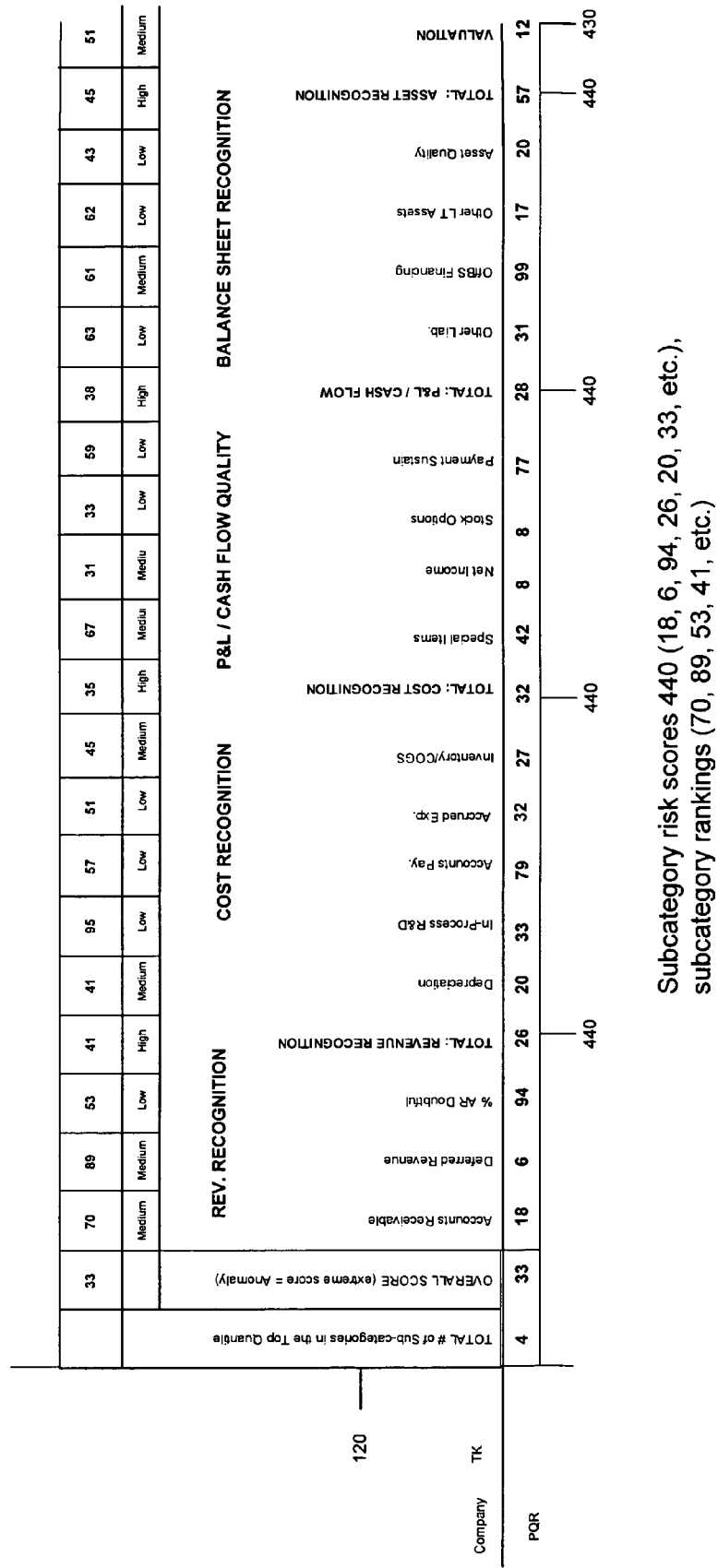

The risk scoring and ranking of a company under review (e.g., company PQR) through framework levels 130-110 is further described herein with reference to FIG. 4A-4C. As shown in FIG. 4C for the company PQR under review, analysis of the Valuation subcategory characteristics leads to assignment of risk scores 420 (e.g. scores 1.1, 4%, 1.9, 4%, respectively) and comparative ranks 425 (e.g., ranks 20, 33, 20 and 51, respectively) at characteristics level 130. A weighted function of characteristics risk scores 420 and analysis of comparative rankings 425, leads to an assignment of a weighted Valuation subcategory risk score 430 (e.g., 12). FIG. 4B summarizes subcategory risk scores or ranks 440 for the other subcategories at level 120, which are obtained by similar weighting of underlying characteristic level information and comparative rankings. The level 120 subcategory risk scores 440 and 430 are then weighted in view of the subcategory comparative rankings to derive the primary category risk scores 450 and comparative ranks 460 shown in FIG. 4A.

The specific set of sub-categories used to support a particular primary F/A category, or the specific set of individual characteristics used to support a particular F/A sub-category, can vary significantly from application to application based on a number of factors. For example, the investment objectives of the investor or analyst using the invention may determine or guide selection of the set of sub-categories used to support a particular primary category. The set of individual characteristics used to support a particular sub-category may in turn be influenced by the availability of specific financial information: as accounting standards change over time, or from country to country, new categories of financial information may become available and old categories of financial information may be superseded or otherwise become unavailable. Alternatively, particular investors or analysts may have access to proprietary or non-public financial information or data, which information or data may then be included in the analysis framework. Improved financial analysis techniques may lead to the addition or elimination of certain sub-categories underlying a particular primary category, or may enable the calculation of new and more useful individual characteristics underlying a particular sub-category. Finally, regulatory trends or popular attention to particular types of accounting issues may bring renewed focus on sub-categories or characteristics that were previously believed to be unimportant.

Figure 2:
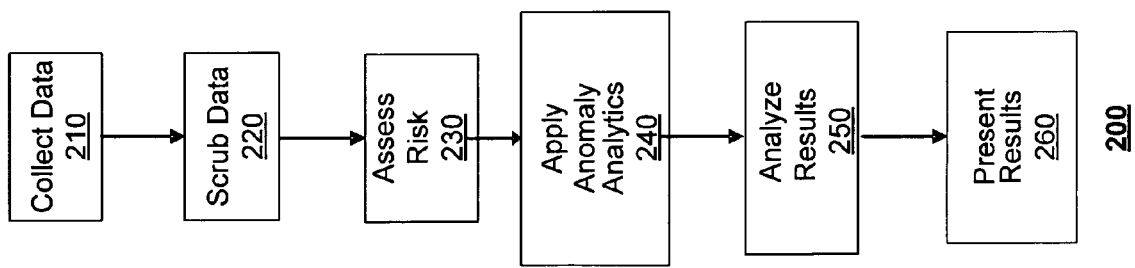
FIG. 2 is a flow diagram illustrating a method of providing portfolio analysis through the identification and reporting of accounting anomalies in accordance with the principles of the present invention.

FIG. 2 shows the steps of an exemplary method 200 for implementing and practicing the accounting-anomaly based risk profiling of the present invention. At step 210, data relating to company information and financials is collected from a number of sources. The sources of data may include financial statements, reported growth characteristics, company analyses, information from regulatory databases, off-balance sheet liabilities, and SEC restatements. At step 220 the data is scrubbed, or cleaned, to remove accounting and inflation distortions. This can be accomplished through strategic analyses that identify trends and SEC inquiries. At step 230, cleaned data from step 220 is used to perform risk assessment for a particular company. The risk assessment includes consideration of valuation and market expectations.

Further at step 240, the analytics for identifying accounting anomalies are performed for a number of primary categories, sub-categories, and individual characteristics under framework 100 described above with reference to FIG. 1. The output of step 240 for each company can be a total score, ranking, or other indicator based on the number of primary categories, sub-categories, or individual characteristics input into the system. The companies can be ranked such that the ranking of a company within a portfolio is based on the overall score, providing a snapshot of companies with the highest overall scores, or indicators, as well as companies that have the most scores within the top quintile.

At optional step 250, the results are further analyzed by special project metrics, which may include accounting adjustments to reported financial statements so that the adjusted statements reflect economic reality. This gate-keeping step 250 is used for updating and ensuring consistency and integrity in the financial statements from participating companies. Special project metrics may also deal with company valuations by linking them to the economic reality. Using special project metrics, industries and individual companies can be examined for accounting anomalies At step 260, the risk scores and ranking results are presented to users. The presentations may include views at overall, category, subcategory and individual characteristic levels and provide users with the information on which the risk scores or rankings at each level were assigned. The presentations may be made over interactive web displays. FIGS. 3A and 3B, show, for example, interactive web-based push or radio buttons 310, which a user can activate to highlight results for P&L category 110C at the category and subcategory levels, respectively.

As previously described, the risk scores and rankings assigned at a higher framework level, may be a weighted function of the risk scores and rankings assigned at lower levels. According to a preferred embodiment of the present invention, a weighting may be applied to each of the individual characteristic underlying a particular risk sub-category based on the historical correlation of that individual characteristic to certain accounting anomalies. Alternatively, an investor or analyst may assign weightings to each individual characteristic based on his/her subjective assessment of the importance that characteristic to his/her investment decisions. The investor or analyst may assign and input the weightings through conventional or dedicated interactive display interfaces (e.g., FIGS. 3A-3B, 4A-4C, etc.). The interactive display interfaces may be suitably configured to allow the investor/analyst to interactively develop different risk scenarios by inputting different weighting scenarios. The weightings can be provided such that the compilation of weightings equals 100% or the weightings can be assigned by group designation, such as, for example, "high," "medium" and "low." In this case, the overall "Valuation" rank of each company is determined by calculating the weighted average the company's rank across all of the relevant individual characteristics. One of ordinary skill in the art will recognize that applying the average or weighted average function to a group of individual characteristics underlying a particular sub-category may only be convenient and that other functions or operations may be applied to the group in order to determine an overall metric for the sub-category without departing from the spirit of the present invention.

For each primary F/A category that is supported by more than one sub-category, anomaly analytics applies the process described above with respect to the "Valuation" sub-category to each of the sub-categories underlying that primary category. For example, the anomaly analytics will determine an overall risk score and/or rank for each of the sub-categories underlying the P&L/Cash Flow Quality primary category (e.g., the "Special Items" sub-category, the "Net Income" sub-category, the "Stock Options" sub-category and the "Payment Risk" sub-category) by applying the process described above with respect to the "Valuation" sub-category to each of those sub-categories.

Having determined the overall risk score and/or rank for each sub-category underlying a particular primary category, the overall risk score and/or rank for each primary category may be determined in a similar manner. That is, the anomaly analytics determines an overall risk score and/or rank for the primary category by, for example, calculating a weighted average of the company's rankings across all relevant sub-categories and then assigning that weighted average to the primary category. For example, for each company in a portfolio, anomaly analytics engine determines an overall risk score and/or rank for the "P&L/Cash Flow Quality" primary category by, for example, calculating a weighted average of the company's rankings in the "Special Items" sub-category, the "Net Income" sub-category, the "Stock Options" sub-category and the "Payment Risk" sub-category, then assigning that weighted average to the "P&L/Cash Flow Quality" primary category. Weightings may be assigned to each sub-category in the same manner as described above with respect to the weighting of individual characteristics.

The process described in the immediately preceding paragraph is applied to each primary category for each company in the portfolio to determine an overall risk profile for the company across all of the primary categories. In addition, an overall risk score and/or rank for each company may be determined by, for example, calculating a weighted average of the scores and/or rankings for that company across all primary categories. That is, anomaly analytics engine determines an overall rank for each company by, for example, calculating the weighted average of the company's rankings in the "Revenue Recognition" category, the "Cost Recognition" category, the "P&L/Cash Flow Quality" category, the "Balance Sheet Recognition" and the "Valuation" category.

According to a preferred embodiment of the present invention, a high ranking in two or more primary categories may result in a further increase to the overall risk profile for a company. For example, a company having a high score or rank in the "Valuation" category is deemed to be more likely to apply aggressive accounting practices. Therefore, a high "Valuation" score in combination with high scores in other accounting F/A categories (e.g., revenue or cost recognition categories) suggests a company that should have a higher overall risk profile. In that case, the overall risk score or rank for that company may be increased accordingly.

The present invention provides a graphical view of a portfolio of companies analyzed in accordance with the immediately foregoing paragraphs. For example, as illustrated in FIGS. 3A, 3B, and 4A-4C, the present invention provides interactive graphical displays of risk scores and rankings to users. In the graphical displays, companies having a high score and/or rank in a particular category or sub-category may be suitably marked so that they can be easily recognized by users by quick visual observation. For example, in spread sheet displays, cells or columns or rows corresponding to the company or companies may color coded or otherwise marked to indicate the level of risk (e.g., a red shading may indicate high risk).

In a preferred embodiment, a red display indicator, visually signals to a user that a company under review has a risk score or rank in a top quantile (e.g., the top decile or quintile) for a particular category or sub-category. FIG. 5A shows, for example, red indicators 510 marking category 110B and overall score 10 columns, indicating that the particular company under review has both a high top decile overall risk score 10 and a high top decile risk scores in category 110B.

Figure 5B:
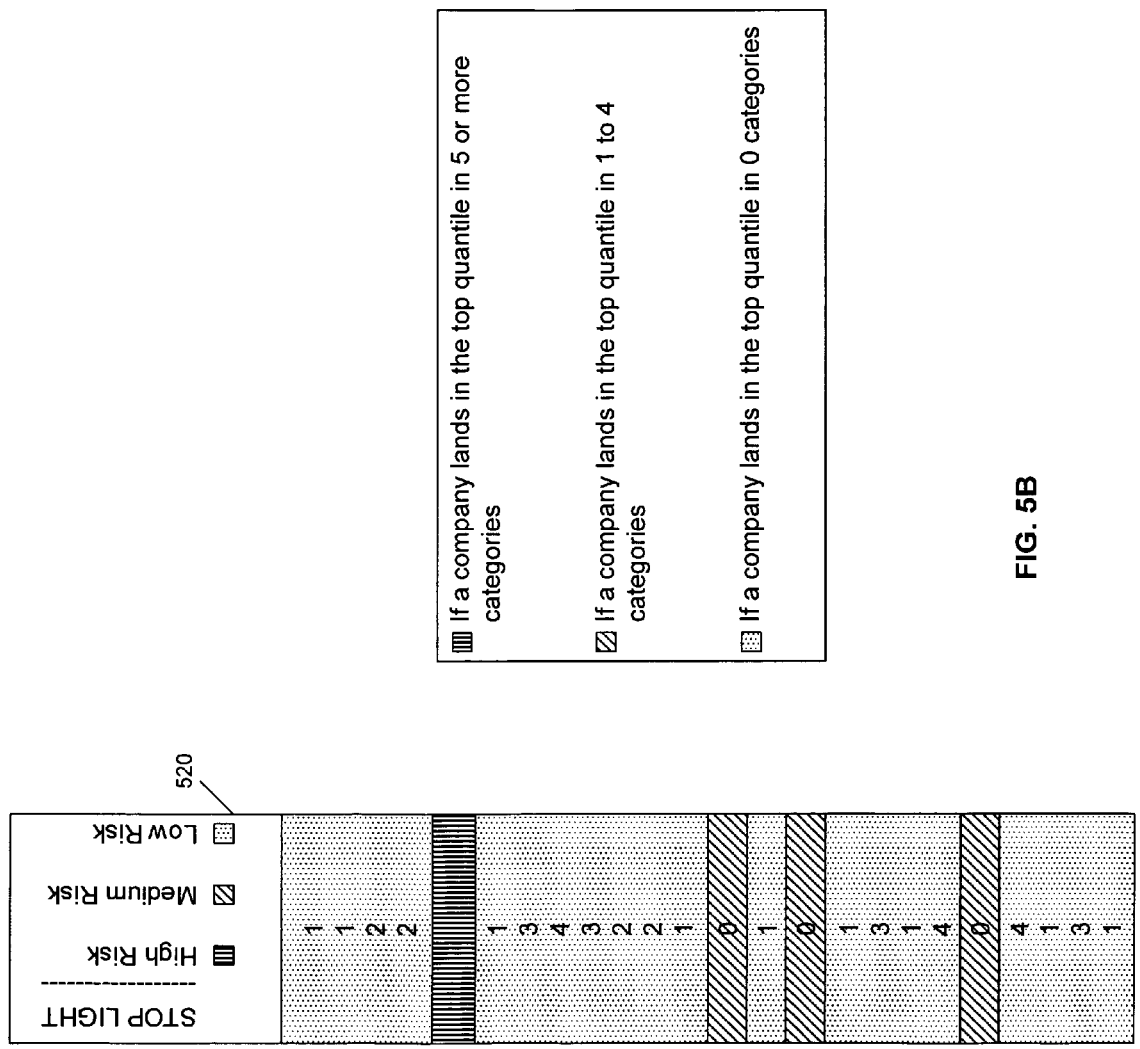

Alternatively or additionally, a "stop light" view with different colors or color shadings, which are proportional to the absolute or relative risk score and ranking values, may be provided to allow a user to visually compare or evaluate the risk profiles of companies. FIG. 5B shows a display provision of a push button or radio button 520, which can be activated by a user, to activate a "stop light view." The stop light view shades display spreadsheet cells in red, yellow, and green colors that are in proportion to the risk score or rank of the company being displayed. For example, if a company is positioned in a top quantile in five or more subcategories, the cell in the stop light column may be shaded a red color. If a company is positioned in the top quantile in one-to-four sub-categories, the cell in the stop light column may be shaded a yellow color. Similarly, if the company is not positioned in the top quantile in any of the subcategory, the cell in the stop light column may be shaded a green color.

A displayed category summary can be ranked by each of the primary categories, by an overall score, or by the total number of categories in a top quantile. A subcategory summary can be ranked by each of the primary categories, the supporting subcategories, by an overall score, or by the total number of categories in a top quantile. Characteristics can be ranked by each primary category, the supporting subcategories, by an overall score, or by the total number of categories. The respective columns can also be ranked in descending or ascending order.

Figure 6:
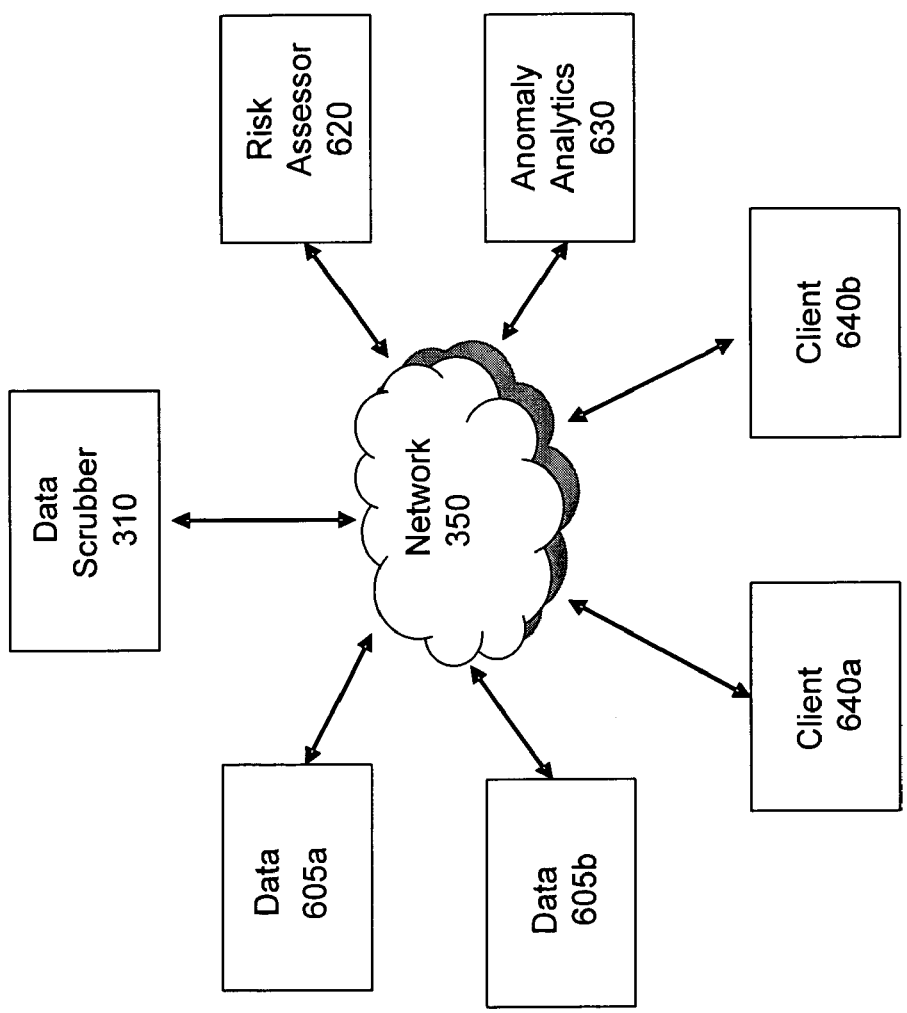
FIG. 6 is a simplified block diagram of a system for providing portfolio analysis through the presentation of accounting anomalies, in accordance with the principles of the present invention.

FIG. 6 is a simplified block diagram of a system for providing portfolio analysis through the identification, evaluation, and presentation of accounting anomalies. The system involves a number of computers or clients, and illustrates two data servers 605a and 605b, two clients 640a and 640b, and a number of other computers including data scrubbing 610, risk assessment 620, and an anomaly analytics engine 630. It will be appreciated that any arbitrary number of computers, servers, hosts or clients can participate in such a system such that each can access a network 650.

The network 650 can take various forms and the exact network topology and protocols are not particularly critical. For example, the network 650 can be established on the Internet, a virtual private network established via the Internet or a fully private network, in each case using wired and/or wireless technology for connection and data transfer.

It will be appreciated that the proposed network, involving large-scale financial transactions, may advantageously take the form of a secure, trusted network. Accordingly, although not shown in FIG. 6, appropriate firewall, data encryption and other security provisions available to protect the integrity of highly confidential data transmission and transactions may with advantage be employed at appropriate points in the system.

The various client computers may be in periodic or continuous communication with an anomaly analytics engine computer server 630 via the exchange network 650. The anomaly analytics engine computer is a trusted intermediary for and among the various clients participating in the system. The accounting anomaly engine will receive and store confidential information from the various clients, such as portfolio content, client identity, and the like.

Figure 7:
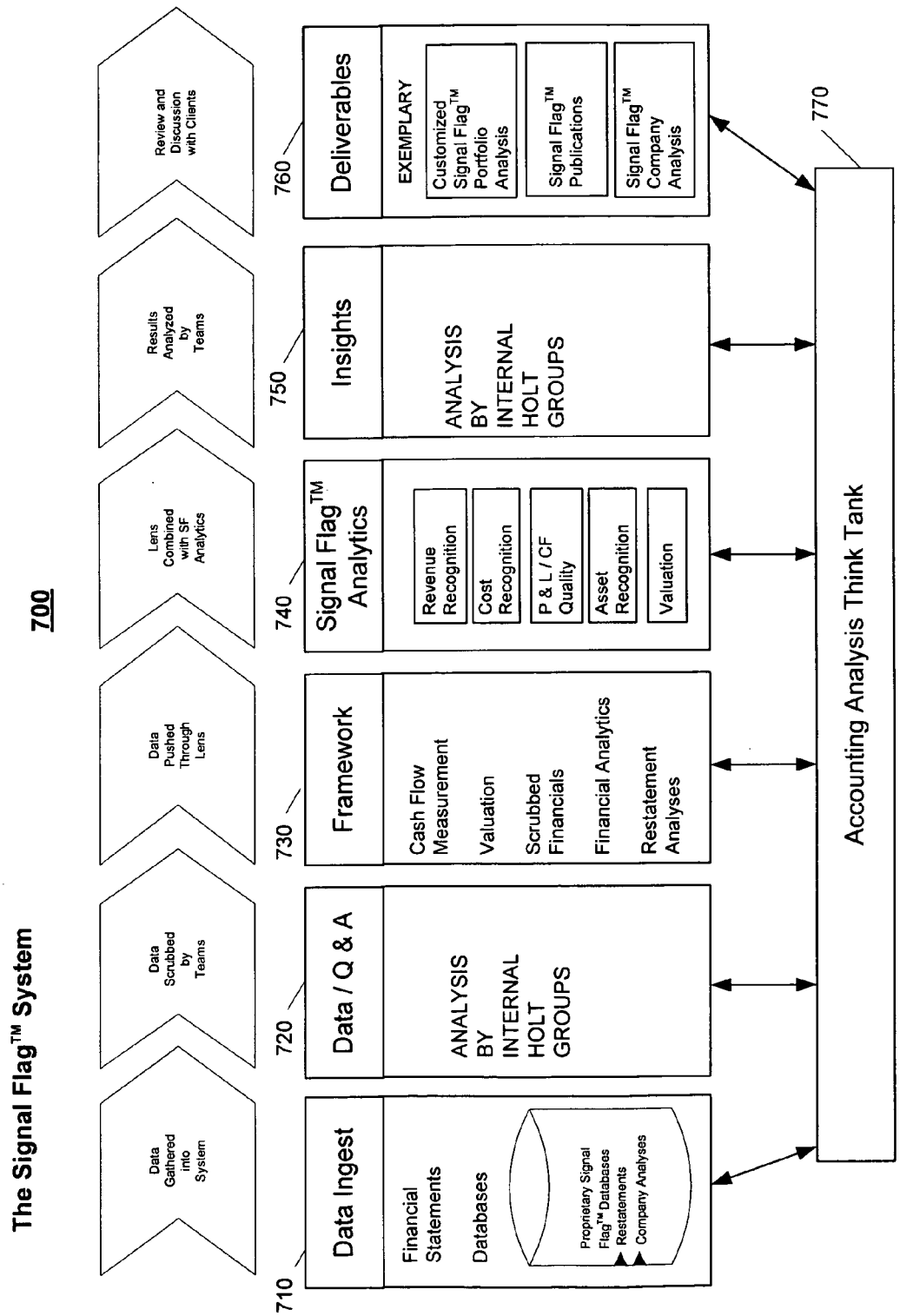
FIG. 7 is a diagram of a financial data processing arrangement, which incorporates an accounting anomaly engine or application to generate company risk scores and ranking for clients, in accordance with the principles of the present invention.

FIG. 7 provides another view of a system for providing portfolio analysis through the identification, evaluation, and presentation of accounting anomalies. FIG. 7 shows an exemplary data processing arrangement 700 which may be implemented by a research provider to deliver risk assessments of individual securities or portfolios of securities to clients using method 200 or like method. Arrangement 700 includes data ingestion and preparation components 710-730, which assemble and process financial data into a form suitable for input to anomaly analytics engine 740. The output of anomaly analytics engine 740 is analyzed by component 750 and delivered to clients in suitable presentations (component 760). The characteristics and functions of individual components 710-760, and their integrated operation to implement method 200 in arrangement 700 may be supervised or co-ordinate by an accounting analysis think tank component 770.

With reference to components 710-730, data ingestion component 710 may collect or assemble data relating to all companies and securities culled from industry financial statements and legacy databases in the manner previously described with reference to step 210 of method 200. The databases may include public as and/or proprietary databases. Data Q & A component 720 may involve one or more assigned entities, groups, or applications to cleanse or scrub component 710 data in the manner previously described with reference to step 220 of method 200. Data Framework component 730 may be designed to perform a suitable number of standardized financial analyses of the scrubbed data (e.g., cash flow measurement, valuation, financial analytics, restatement analyses, etc.). The number and types of standardized financial analyses may be selected by component 470 upon consideration, for example, of the theoretical advantages and the practicality of such financial analyses. The standardized financial analyses may be conventional at least in the sense that they are performed by the research provider in other contexts. Further, the selected standardized financial analyses may reflect current security industry or personal practice, fashions, or perspectives on which financial analyses provide metrics that effectively indicate or co-relate with a company's or security's future performance.

Data framework component 730 is interfaced with anomaly analytics engine 740, which may analyze accounting anomalies and assign an overall anomaly risk score or rank to a company or security in a manner similar to that previously described with reference to step 240 of method 200. The assignment of the overall risk score or anomaly rank to a company or security may be based on weighted anomaly risk scores or rankings in a number of primary categories, sub-categories, and individual characteristics. The companies can be ranked such that the ranking of a company within a portfolio is based on the overall score, providing a snapshot of companies with the highest overall scores, or indicators, as well as companies that have the most scores within the top decile.

In an exemplary embodiment, the five primary categories and the overall risk score are important indicators for making investment decisions, but a high score in one of the supporting subcategories or characteristics may be equally important. Component 750 and 760 may provide a work sheet presentation to clients in which the same five primary categories are further broken down into 15 or more supporting screens. This worksheet may be used to review individual supporting screens to determine which companies have the greatest risk exposure. High scores (in the first decile) may warrant further qualitative investigation. High scores do not indicate an accounting blow is for certain, but it does indicate that the reason (acquisition, change in accounting, change in business strategy, earnings manipulation) should be qualitatively investigated.

The primary categories and sub-categories used in the preferred embodiment may have definitions that are consistent with standard industry accounting procedures. Appendix A lists the definitions and brief descriptions of several of the primary categories and subcategories named herein. See also, Epstein, Barry et al., "Interpretation and Application of Generally Accepted Accounting Principles" (John Wiley & Sons, Inc. 2004).

It may be now be useful to set forth a number of exemplary applications of the present invention.

EXAMPLE ABCD

Company ABCD recently announces restatements related to taxes, retirement benefits and other items for 2003 and 2004. The restatements should not materially effect revenues or cash flows, but earnings will be slightly lower and the filing of the 2004 10-K will be delayed While the current restatements seem to imply little additional risk to Company ABCD, certain other "flagged" categories point to business risks that are already at the top priority of investors' focus:

The high Asset Quality score is driven by low turns (second lowest of peer group in portfolio) and low Net to Gross Plant ratio (implying aging assets). One current concern is that the economic life of Company ABCD's assets will fall short of management expectations (which should negatively impact turns)

Company ABCD's high Payment Risk score is driven by negative Excess Cash Coverage (high R&D, CAPEX and dividend payments). Company ABCD continues to increase its already high debt load to make acquisitions, and is currently at risk of being downgraded to below investment grade The Off B/S Financing score is driven by a debt (less cash) to Market Cap ratio that is greater than 1.0, and increasing, which further supports the market's fear that the Company is over-levered Overall, the accounting risk stemming from recent restatements appears to be low, but the "flagged" areas in which the Company has yet to restate coupled with recent business decisions could lead to greater accounting risk in the future While Company ABCD's valuation ranking is one of the lowest in its industry, current expectations, compared to historical metrics, have left Company ABCD overvalued.

EXAMPLE XYZ

While Company XYZ's Deferred Revenue balance had been increasing commensurate with its increase in sales in 2002 and 2003, in 2004 the balance declined even as sales increased. Company XYZ's % AR Doubtful increased significantly during 2004 to 18% of Gross AR from 7% of Gross AR in 2003. No explanation was provided in the 2004 10-K Company XYZ's Depreciation is 75% of its Gross Cash Flow and the Company's Project Life (Gross Plant/Depreciation) has increased from 9.2 to 12.2 over the past three years. The 10-K mentions that certain assets have been fully depreciated, and the Company wrote-down the value of their fixed assets by approximately $3.6 billion upon their emergence from bankruptcy in January, 2003. This could imply that Company XYZ's earnings are overstated or that the Company is facing large future capital investments The Company has had large Special Items in recent years, including asset impairments, recapitalization expenses, losses on the extinguishment of debt and other. The majority of these expenses appear to be related to the Company's bankruptcy.

Company XYZ has negative excess cash coverage due to its significant fixed asset retirements and rental expenses, and while the Company recently emerged from bankruptcy, they still have almost $6 billion of debt on their balance sheet.

Company XYZ's VCR and EV/GCF ratios rank below the average for its Media peers in the portfolio.

Although the present invention has been described in connection with specific exemplary embodiments, it should be understood that various changes, substitutions and alterations can be made to the disclosed embodiments without departing from the spirit and scope of the invention as set forth in the appended claims.

APPENDIX A

Definitions and Descriptions of Primary Categories and Subcategories

Revenue Recognition

Revenue recognition is typically a cause for regulator investigations and financial restatements. To boost revenues, companies might recognize sales prematurely, or during a period prior to the one dictated by GAAP/IFRS. The following sub-categories are included within Revenue Recognition.

Accounts Receivable: Primary screens relate to the materiality and risk related to days accounts receivable outstanding.

Deferred Revenue: Primary screens relate to the materiality and risk related to changes in deferred revenue.

% AR Doubtful: Primary screens relate to the materiality and risk related to changes within a company's % AR doubtful.

Cost Recognition

Cost recognition studies the relationship and trends between a company's assets and costs. For example, anomalies within growth in gross pant relative to depreciation and cost of goods sold relative to inventory are examined. The following sub-categories are included within Cost Recognition.

Depreciation: Primary screens relate to the materiality and risk related to changes within a firm's deprecation expenses relative to gross plant.

In-Process R&D: Primary screens relate to the materiality and risk related to the recognition of in-process R&D.

Accounts Payable: Primary screens relate to the materiality and risk related to days accounts payable outstanding.

Accrued Expenses: Primary screens relate to the materiality and risk related to changes in accrued expenses related to cost of good sold and inventory balances.

Inventory/COGS: Primary screens relate to the materiality and risk related to changes in inventory balances related to cost of good sold and inventory balances.

Profit & Loss/Cash Flow Quality

Profit & Loss/Cash Flow looks at impact certain charges such as stock options, taxes, and special charges have on a company's earnings relative to cash flows. The following sub-categories are included within Profit & Loss/Cash Flow.

Special Items: Primary screens relate to the materiality and risk related to the frequency and magnitude of special charges reported within the income statement. Examples include one-time gains/losses, asset impairments, and acquisition charges.

Net Income (Quality): Primary screens relate to the materiality and risk related to changes in net income relative inflated adjusted gross cash flows.

Stock Options: Primary screens relate to the materiality and risk related to the recognition of stock option expense within the income statement.

Payment Risk: Primary screens relate to the materiality and risk related to a company's ability to fund operating (depreciation, pensions) and financing costs (interest) relative to gross cash flows.

Balance Sheet Recognition

Balance sheet recognition examines the trends and changes in often overlooked accounts such as other assets, other liabilities, and off balance-sheet leases and pensions. Trends in the utilization of assets relative to sales growth, the age of company assets and effect of goodwill are also examined. The following sub-categories are included within Balance sheet recognition.

Other Liabilities: Primary screens relate to the materiality and risk related to changes in other liabilities relative to a firm's total gross investment.

Off B/S Financing: Primary screens relate to the materiality and risk related to firms off-balance sheet obligations such as pensions and operating leases.

Other Long Term Assets: Primary screens relate to the materiality and risk related to changes in other assets relative to a firm's total gross investment.

Asset Quality: Primary screens relate to the materiality and risk related to firms assets relative to sales trends and total goodwill/intangibles. The age of a company's assets is also considered.

Valuation

The combination of red flag accounting and a high valuation can substantially increase a shareholder's risk profile. Firms with high expectations (valuation) may be more tempted to apply aggressive accounting practices. To quantify the value of a red flag, traditional value metrics (PIE, P/S, EV/EBTIDA) may be of little help, as they are comprised of the very same distortions. Popular ratios like the P/E, EV/EBITDA, and Price-to-Book often give unreasonably poor information, even when used for simple, high-level screenings, even within small, well-defined industries.

To determine valuation, investors should use value metrics that are "clean" and are applied within the context of a comprehensive performance and valuation framework that adjusts for accounting distortions.

A valuation metric, such as value-to-cost ratio, allows users to create quick screens of valuation levels across thousands of companies worldwide, from micro-caps to the largest companies, over decades of historical activity.

We claim:

1. A computer-implemented method for evaluating investment risk due to accounting misstatements comprising:
receiving a selection of categories, subcategories corresponding to each category, and characteristics corresponding to each subcategory, the identity of a company within a portfolio of companies for evaluation, and financial accounting data, including accounting misstatement data, associated with portfolio components;
determining, iteratively, for each company in the portfolio, historical characteristic risk scores derived from the financial accounting data;
calculating, iteratively via the computer, for each subcategory, evaluated company subcategory risk ranks through application of (1) determined characteristic risk ranks indicative of the historical characteristic risk scores compared with portfolio components and (2) derived characteristic weights that reflect historical correlation of the characteristics with the accounting misstatement data to a characteristic weighted function;

calculating, iteratively via the computer, for each category, evaluated company category risk ranks through application of (1) calculated subcategory risk ranks and (2) derived subcategory weights that reflect historical correlation of the subcategories with the accounting misstatement data to a subcategory weighted function; and generating a comparative categorical investment risk assessment indicator for the evaluated company derived from the calculated category risk ranks.

2. The method of claim 1, further comprising calculating an evaluated company risk rank through application of (1) calculated category risk ranks and (2) derived category weights that reflect historical correlation of the categories with the accounting misstatement data to a category weighted function.

3. The method of claim 1, further comprising iteratively calculating subcategory risk ranks for remaining portfolio components.

4. The method of claim 1, wherein the comparative categorical risk assessment indicator is configured to display the calculated category risk ranks.

5. The method of claim 1, wherein the comparative categorical risk assessment indicator is further configured to display at least one of: risk profiles of companies within the portfolio of companies relative to each other, risk profile views in descending/ascending lists, risk profile views by individual categories, risk profile views by individual subcategories, and any combination thereof.

6. The method of claim 1, further comprising correlating the comparative categorical risk assessment indicator with a color coded level of accounting misstatement risk.

7. A computer-implemented system for evaluating investment risk due to accounting misstatements comprising:

a computer system, having a processor configured to implement an anomaly analytics engine configured to:

receive a selection of categories, subcategories corresponding to each category, and characteristics corresponding to each subcategory, the identity of a company within a portfolio of companies for evaluation, and financial accounting data, including accounting misstatement data, associated with portfolio components;

determine, iteratively, for each company in the portfolio, historical characteristic risk scores derived from the financial accounting data;

calculate, iteratively via the computer, for each subcategory, evaluated company subcategory risk ranks through application of (1) determined characteristic risk ranks indicative of the historical characteristic risk scores compared with portfolio components and (2) derived characteristic weights that reflect historical correlation of the characteristics with the accounting misstatement data to a characteristic weighted function;

calculate, iteratively via the computer, for each category, evaluated company category risk ranks through application of (1) calculated subcategory risk ranks and (2) derived subcategory weights that reflect historical correlation of the subcategories with the accounting misstatement data to a subcategory weighted function; and generate a comparative categorical investment risk assessment indicator for the evaluated company derived from the calculated category risk ranks.

8. The system of claim 7, wherein the anomaly analytics engine is further configured to calculate an evaluated company risk rank through application of (1) calculated category risk ranks and (2) derived category weights that reflect historical correlation of the categories with the accounting misstatement data to a category weighted function.

9. The system of claim 7, wherein the anomaly analytics engine is further configured to iteratively calculate subcategory risk ranks for remaining portfolio components.

10. The system of claim 7, wherein the comparative categorical risk assessment indicator is configured to display the calculated category risk ranks.

11. The system of claim 7, further comprising correlating the comparative categorical risk assessment indicator with a color coded level of accounting misstatement risk.

12. The system of claim 7, wherein the comparative categorical risk assessment indicator is further configured to display at least one of: risk profiles of companies within the portfolio of companies relative to each other, risk profile views in descending/ascending lists, risk profile views by individual categories, risk profile views by individual subcategories, and any combination thereof.

13. The method of claim 1, further comprising iteratively calculating category risk ranks for remaining portfolio components.

14. The system of claim 7, wherein the anomaly analytics engine is further configured to iteratively calculate category risk ranks for remaining portfolio components.

15. The method of claim 1, wherein the categories comprise revenue recognition, cost recognition, profit and loss to cash flow, balance sheet recognition, and valuation.

16. The system of claim 7, wherein the categories comprise revenue recognition, cost recognition, profit and loss to cash flow, balance sheet recognition, and valuation.

* * * * *

UNITED STATES PATENT AND TRADEMARK OFFICE
CERTIFICATE OF CORRECTION

| | |
|---|---|
| PATENT NO. | : 8,234,200 B2 |
| APPLICATION NO. | : 11/479771 |
| DATED | : July 31, 2012 |
| INVENTOR(S) | : Ronald J. Graziano et al. |

Page 1 of 1

It is certified that error appears in the above-identified patent and that said Letters Patent is hereby corrected as shown below:

On the title page, under item [12]:
"Grazlano et al." should be changed to --Graziano et al.--

On the title page, item (75) Inventors:
"Ronald J. Grazlano" should be changed to --Ronald J. Graziano--

Signed and Sealed this
Thirteenth Day of November, 2012

David J. Kappos
*Director of the United States Patent and Trademark Office*